(12) United States Patent
Horikawa et al.

(10) Patent No.: US 7,609,252 B2
(45) Date of Patent: Oct. 27, 2009

(54) TOUCH PANEL

(75) Inventors: Satoru Horikawa, Gunma (JP); Yuzuru Fujita, Gunma (JP)

(73) Assignee: Shoei Co., Ltd., Gunma (JP)

( * ) Notice: Subject to any disclaimer, the term of this patent is extended or adjusted under 35 U.S.C. 154(b) by 691 days.

(21) Appl. No.: 11/212,994

(22) Filed: Aug. 26, 2005

(65) Prior Publication Data
US 2006/0043374 A1 Mar. 2, 2006

(30) Foreign Application Priority Data
Aug. 31, 2004 (JP) .............. P2004-253345

(51) Int. Cl.
*G09G 5/00* (2006.01)
(52) U.S. Cl. .................................... 345/173
(58) Field of Classification Search ................ 345/173; 178/18.01; 200/512, 515
See application file for complete search history.

(56) References Cited

U.S. PATENT DOCUMENTS 5,844,175 A * 12/1998 Nakanishi et al. ........ 178/18.03

6,690,361 B1 * 2/2004 Kang et al. ................. 345/173
7,215,331 B2 * 5/2007 Song et al. ................. 345/173

FOREIGN PATENT DOCUMENTS

| JP | 2003-316517 | 11/2003 |
|----|-------------|---------|
| JP | 2004-178106 | 6/2004  |

* cited by examiner

*Primary Examiner*—Richard Hjerpe
*Assistant Examiner*—Tom V Sheng
(74) *Attorney, Agent, or Firm*—Fish & Richardson P.C.

(57) ABSTRACT

In a touch panel, upper and lower electrode connecting portions are provided in the vicinity of a sealing agent formed above extending electrodes, and the upper and lower electrode connecting portions are connected so as to overlap each other. Accordingly, a gap between a height of the overlap of the upper and lower electrode connecting portions and a height of the sealing agent is relaxed. In this way, it is possible to reduce occurrence of cracks on the touch panel upon pressurizing upper and lower substrates.

4 Claims, 5 Drawing Sheets

TOUCH PANEL

BACKGROUND OF THE INVENTION

1. Field of the Invention

The present invention relates to a touch panel, more specifically, to a touch panel configured so that a difference becomes less obvious in thickness between upper and lower electrode connecting portions and a sealing agent portion.

2. Description of the Related Art

A conventional touch panel will be described with reference to FIGS. 4A and 4B.

FIG. 4A is a perspective view showing a conventional touch panel in the state of disintegrating an upper substrate and a lower substrate. As shown in the drawing, the conventional touch panel includes an upper substrate 1, a lower substrate 2, a transparent conductive film 11 formed on one surface of the upper substrate 1, a transparent conductive film 21 formed on one surface of the lower substrate 2, two upper position detection electrodes 12 formed on the upper substrate 1 so as to face each other, two lower position detection electrodes 22 formed on the lower substrate 2 so as to face each other, extending electrodes 31, 32, 33 and 34 which extend to the outside of the touch panel (hereinafter referred to as extending electrodes), the extending electrode being formed on the lower substrate 2, and a sealing agent 4 for attaching peripheral edges of the upper substrate 1 and the lower substrate 2 together.

A glass plate is used for the upper substrate 1, and the transparent conductive film 11 is formed on the entire surface thereof except the peripheral edges. Moreover, the upper position detection electrodes 12 for detecting a position in an X direction are provided along an upper edge and a lower edge of the transparent conductive film 11.

A glass plate is used for the lower substrate 2, and the transparent conductive film 21 is formed on the entire surface thereof except the peripheral edges. Moreover, the lower position detection electrodes 22 for detecting a position in a Y direction are provided along a left edge and a right edge of the transparent conductive film 21. The extending electrodes 31 and 33 are extended from the lower position detection electrodes 22, and the extending electrode 32 and 34 are extended by connecting lower electrode connecting portions 36 provided on another ends thereof to the upper position detection electrodes 12 of the upper substrate 1.

Each upper electrode connecting portion 16 provided on an end of each upper position detection electrode 12 and each lower electrode connecting portion 36 provided on another end of each of the extending electrodes 32 and 34 are formed in positions corresponding to corner portions of the upper substrate 1 which have relatively large spaces.

The upper substrate 1 and the lower substrate 2 of the above-described configuration are arranged such that the transparent conductive films 11 and 21 are opposed to each other, and are bonded together at the peripheral edges outside the upper position detection electrodes 12 and the lower position detection electrodes 22 by use of the sealing agent 4.

Next, FIG. 4B is a cross-sectional view taken along the E-E line in FIG. 4A when the upper substrate 1 is bonded to the lower substrate 2. As shown in the drawing, the upper electrode connecting portion 16 and the lower electrode connecting portion 36 are connected so as to overlap each other in terms of a direction of pressurization by use of an unillustrated conductive adhesive.

The above-described touch panel is configured such that when an arbitrary point is pressed with a finger, a pen or the like, the transparent conductive film 11 of the upper substrate 1 and the transparent conductive film 21 of the lower substrate 2 contact each other at that point. Here, a resistance value of the transparent conductive film 11 is detected and the x-coordinate of the point can be thereby identified. Meanwhile, a resistance value of the transparent conductive film 21 is detected and the y-coordinate of the point can be thereby identified.

When the pressing operation is stopped, the transparent conductive film 11 of the upper substrate 1 and the transparent conductive film 21 of the lower substrate 2 are detached and the touch panel is set to off-state. This technology is described for instance in Japanese Unexamined Patent Publication No. 2003-316517 (claim 4, FIG. 2).

Another conventional touch panel will be described with reference to FIGS. 5A to 5C.

FIG. 5A is a perspective view showing another conventional touch panel in the state of disintegrating an upper substrate and a lower substrate. This conventional touch panel has the same configuration as the touch panel shown in FIGS. 4A and 4B except that the positions of the upper electrode connecting portions 16 of the upper position detection electrodes 12 on the upper substrate, the positions of the lower electrode connecting portions 36 of the extending electrodes 32 and 34 on the lower substrate 2, and the shapes of the lower electrode connecting portions 36 are different. Here, the portions corresponding to those in FIGS. 4A and 4B are designated by the same reference numerals and detailed description thereof will be omitted.

As shown in the drawings, the lower electrode connecting portions 36 of the extending electrodes 32 and 34 are provided in the vicinities of the portions where the sealing agent 4 is formed inside the extending electrodes 32 and 34. Meanwhile, the upper electrode connecting portions 16 of the upper substrate 1 are extended to the position corresponding to the upper parts of the lower electrode connecting portions 36.

FIG. 5B is an enlarged view of the upper and lower electrode connecting portions 16 and 36 when the upper substrate 1 and the lower substrate 2 in FIG. 5A are bonded together. As shown in the drawing, the lower electrode connecting portion 36 of the lower substrate 2 formed into a shape to pinch the upper electrode connecting portion 16 of the upper substrate 1. The upper electrode connecting portion 16 of the upper substrate 1 is disposed in an opening of the lower electrode connecting portion 36, and is connected thereto by use of an unillustrated conductive adhesive.

FIG. 5C is a cross-sectional view taken along the F-F line in FIG. 5B. As shown in the drawing, the lower electrode connecting portion 36 is connected so as to pinch the upper electrode connecting portion 16. Accordingly, the lower electrode connecting portion 36 and the upper electrode connecting portion 16 are configured not to overlap in the pressing direction of the upper and lower substrates 1 and 2. This technology is described for instance in Japanese Unexamined Patent Publication No. 2004-178106.

As described above, in the former conventional touch panel, the upper and lower electrode connecting portions 16 and 36 are provided in the positions corresponding to the corner portions of the upper substrate 1. For this reason, it is possible to ensure large spaces for connecting the upper electrode connecting portions 16 to the lower electrode connecting portions 36, and thereby to connect the upper and lower electrode connecting portions 16 and 36 easily.

However, due to the above-described configuration, there is a large gap between a thickness which is caused by overlapping the upper electrode connecting portion 16 on the lower electrode connecting portion 36, and, a thickness of the sealing agent 4 formed outside thereof. When the upper and lower substrates 1 and 2 are attached together by pressurization and baking in this state, stress concentration would occur at the portions of the upper and lower electrode connecting portions 16 and 36, which would cause cracks on the upper substrate 1 made of glass.

Moreover, when attaching the upper and lower substrates 1 and 2 together by pressurization and baking, it is difficult to control the pressure to be applied to the upper and lower electrode connecting portions 16 and 36 and to adjust the amount of the sealing agent 4 to be formed relevantly. For this reason, the width of the sealing agent 4 would become uneven in the vicinities of the upper and lower electrode connecting portions 16 and 36, which would cause adhesion failures.

Meanwhile, in the latter conventional touch panel described above, the upper and lower electrode connecting portions 16 and 36 are provided in the vicinities of the portions where the sealing agent 4 is formed inside the extending electrodes 32 and 34 of the lower substrate 2. For this reason, the gap between the thickness of the upper and lower electrode connecting portions 16 and 36 and the thickness of the sealing agent in the vicinity thereof becomes less obvious when attaching the upper and lower substrates 1 and 2 together. Accordingly, it is possible to reduce cracks at the portions of the upper and lower electrode connecting portions 16 and 36, which occur at the time of attaching the upper and lower substrates 1 and 2 together by pressurization and baking.

However, as the lower electrode connecting portion 36 is formed into the shape so as to pinch the upper electrode connecting portion 16, it is necessary to form the width of the lower electrode connecting portion 36 wider than the upper electrode connecting portion 16. For this reason, the area of the upper and lower electrode connecting portions 16 and 36 is increased and an operating region of the touch panel is reduced as a consequence.

Moreover, by repeating the pressing operation on the upper substrate 1, connection between the upper and lower electrode connecting portions 16 and 36 becomes unstable, whereby it is difficult to achieve identification of the pressed position.

SUMMARY OF THE INVENTION

The present invention has been accomplished in light of the foregoing problems. The present invention provides a touch panel that has an upper substrate provided with a transparent conductive film and an upper position detection electrode on one surface thereof, and a lower substrate provided with a transparent conductive film, a lower position detection electrode, upper and lower electrode connecting portions, and an extending electrode on one surface thereof, which are bonded together, with a sealing agent interposed between the upper and lower substrates, while disposing the transparent conductive film of the upper substrate and the transparent conductive film of the lower substrate to face each other. Here, the upper and lower electrode connecting portions are formed in the vicinity of a portion of the extending electrode where the sealing agent is formed, and a difference becomes less obvious between a thickness of the upper and lower electrode connecting portions and a thickness of an overlap of the extending electrode and the sealing agent, the upper position detection electrode of the upper substrate and the extending electrode of the lower substrate being connected together so as to overlap in a pressing direction of the upper substrate with a conductive adhesive in the upper and lower electrode connecting portions.

According to the present invention, in the first place, the sealing agent is formed above external connection terminal electrodes in the vicinities of the upper and lower electrode connecting portions. Therefore, the gap between the thickness of the upper and lower electrode connecting portions and the thickness of the overlap of the sealing agent and the extending electrode becomes less obvious. For this reason, it is possible to reduce occurrence of cracks at the portion of an upper electrode connecting portion of the upper substrate when attaching the upper and lower substrates together.

Moreover, by connecting the upper and lower electrode connecting portions so as to overlap each other in a pressing direction, the connection between the upper and lower electrode connecting portions 16 and 36 is not detached even when the pressing operation of the touch panel is repeated. In this way, it is possible to identify the pressed position in a stably connected state.

In the second place, since it is not necessary to make the widths of the electrode connecting portions wider than formation widths of position detection electrodes of the upper and lower substrates, it is possible to secure a wide operating region of the touch panel.

In the third place, by providing the extending electrode substantially in the center of the lower substrate, it is possible to adjust an amount of formation of the sealing agent in order to uniform the width of the sealing agent formed in the vicinity of the lower electrode connecting portion provided on another end of the extending electrode, and to perform pressurization control easily.

In the fourth place, the grain size of the filler contained in the extending electrode is greater than the grain size of the filler contained in the sealing agent. Accordingly, when attaching the upper and lower substrates together, it is possible to provide a gap between the upper and lower substrates with a sufficient height, and thereby to reduce occurrence of Newton rings.

DETAILED DESCRIPTION OF PREFERRED EMBODIMENT

An embodiment of the present invention will be described in detail with reference to FIG. 1 to FIG. 3C.

Figure 1:
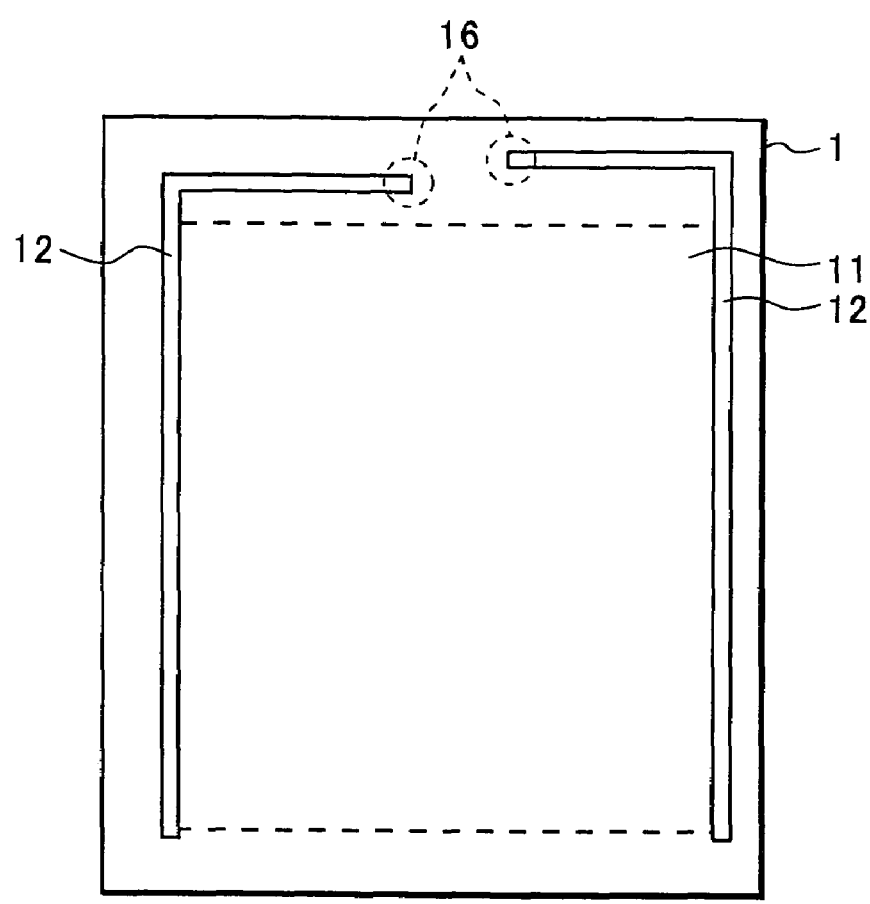
FIG. 1 is a plan view for describing an upper substrate of a touch panel according to an embodiment of the present invention.

FIG. 1 is a plan view of an upper substrate of a touch panel according to an embodiment of the present invention. FIG. 1 is illustrated in an inside-out direction relative to FIGS. 2A to 2C for the purpose of facilitating comparison between FIG. 1 and FIGS. 2A to 2C. As shown in the drawing, an upper substrate 1 is made of a flexible glass substrate having a thickness of 0.2 mm, and a transparent conductive film 11 and upper position detection electrodes 12 are formed on a lower surface thereof.

The transparent conductive film 11 is made of an indium tin oxide (ITO) film, which is formed by vapor depositing indium oxide and the like. The transparent conductive film 11 is formed on the entire surface except peripheral edges. The upper position detection electrodes 12 that are electrically connected to the transparent conductive film 11 are formed by mixing conductive paste and unillustrated plastic filler having a grain size of about 15 μm, which are provided along a right edge and a left edge of the transparent conductive film 11. One end of each of the upper position detection electrodes 12 constitutes an upper electrode connecting portion 16, which is extended to a position corresponding to a position of a lower electrode connecting portion 36 (see FIG. 2A) of a lower substrate 2.

Figure 2A:
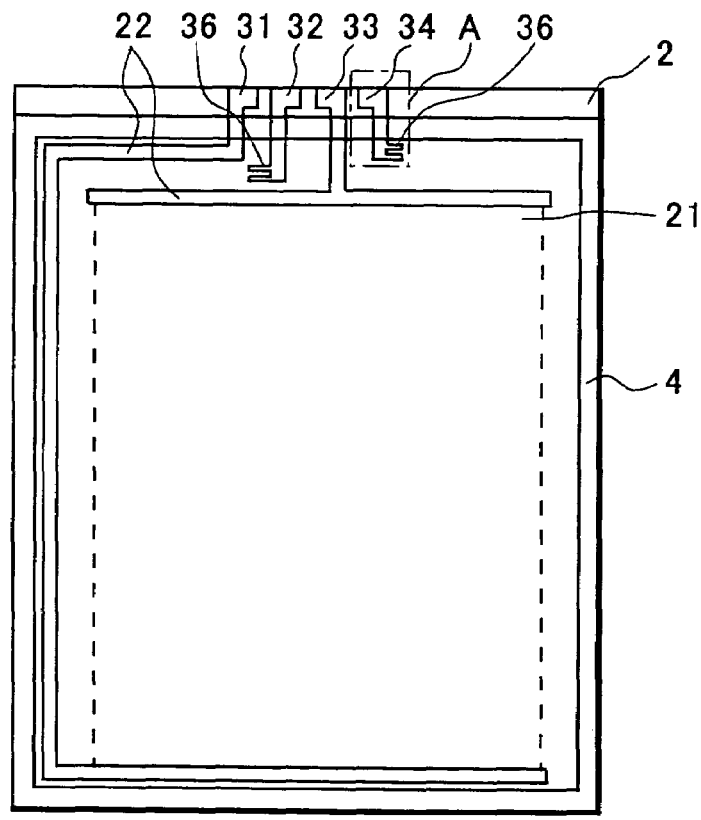
FIGS. 2A and 2B are plan views and FIG. 2C is a cross-sectional view for describing a lower substrate of the touch panel according to the embodiment of the present invention.
Figure 2B:
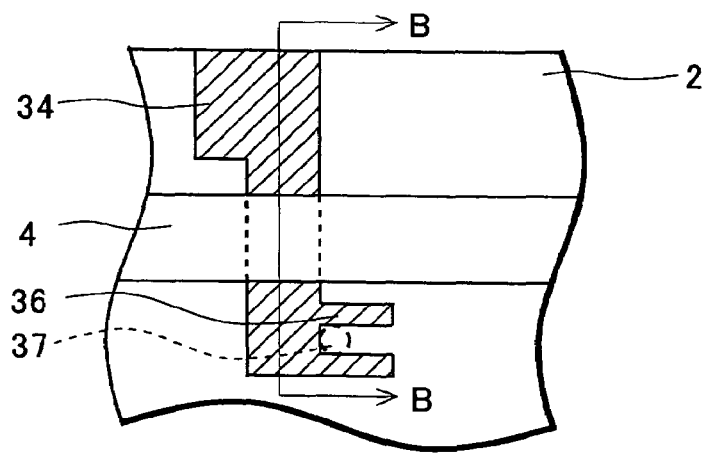
Figure 2C:
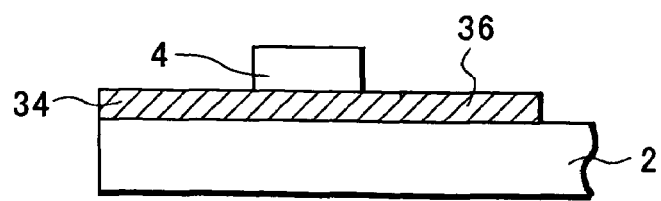

FIGS. 2A to 2C are constructional views of the lower substrate 2 of the touch panel according to the embodiment of the present invention. FIG. 2A is a plan view of the lower substrate 2. As shown in the drawing, the lower substrate 2 is made of a glass substrate having a thickness of 1.1 mm, and a transparent conductive film 21, lower position detection electrodes 22, extending electrodes 31, 32, 33, and 34, and a sealing agent 4 are formed on an upper surface thereof The transparent conductive film 21 is formed by a similar method applied to the transparent conductive film 11 of the upper substrate 1. The lower position detection electrodes 22 and the extending electrodes 31, 32, 33, and 34 are made of the same material as the upper position detection electrodes 12 of the upper substrate 1. The extending electrodes 31, 32, 33, and 34 are gathered and disposed substantially in the center of one edge of the lower substrate 2.

The lower position detection electrodes 22, which are electrically connected to the transparent conductive film 21, are provided along an upper edge and a lower edge of the transparent conductive film 21. Lower electrode connecting portion 36 to be connected to the upper position detection electrode 12 of the upper substrate 1 is formed on another end of each of the extending electrodes 32 and 34.

The sealing agent 4 is formed on the peripheral edges of the lower substrate 2. Unillustrated filler made of glass fiber having a grain size of about 8 μm is mixed with the sealing agent 4. In this way, it is possible to adjust the thickness and the width of the sealing agent 4 easily, which tends to vary when the upper and lower substrates 1 and 2 are pressurized and attached together.

Moreover, the sealing agent 4 is formed thicker than the grain size of the filler which is approximately equal to 8 μm. In this way, it is possible to attach the upper substrate 1 to the sealing agent 4 securely upon pressurization of the upper and lower substrates 1 and 2.

FIG. 2B is an enlarged view of an area A shown in FIG. 2A. As shown in the drawing, the sealing agent 4 is provided between the extending electrode 34 and the lower electrode connecting portion 36, and is formed above the extending electrode 34. A formation width of the lower electrode connecting portion 36 and a formation width of the upper electrode connecting portion 16 (see FIG. 1) of the upper substrate 1 are mutually equal.

Moreover, the lower electrode connecting portion 36 is formed into a concave shape. When attaching the upper and lower substrates 1 and 2 together, a conductive adhesive 37 is applied to the concave portion, and the upper position detection electrode 12 is connected to an upper part thereof in an overlapping fashion.

FIG. 2C is a cross-sectional view taken along the B-B line in FIG. 2B. As shown in the drawing, the sealing agent 4 is formed above the extending electrode 34. For this reason, the thickness of that portion becomes thicker as compared to that of the lower electrode connecting portion 36 by the thickness of the sealing agent 4. Accordingly, upon attachment of the upper and lower substrates 1 and 2, a gap between the thickness of an overlap of the upper and lower electrode connecting portions 16 and 36 and the thickness of an overlap of the sealing agent 4 and the extending electrode 34 becomes less obvious. Details will be described later.

Figure 3A:
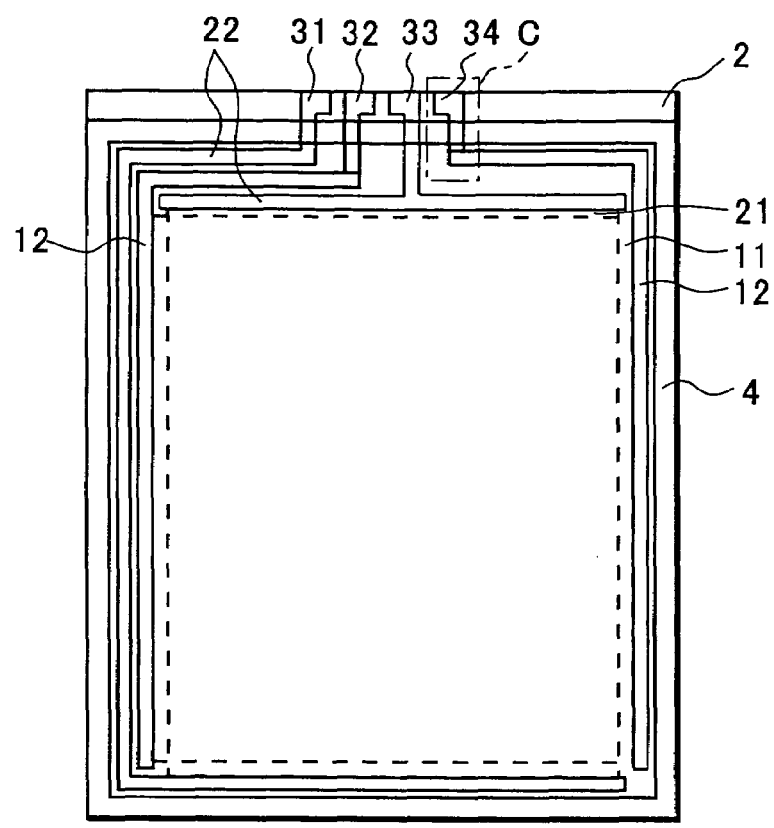
FIGS. 3A and 3B are plan views and FIG. 3C is a cross-sectional view for describing the touch panel according to the embodiment of the present invention.
Figure 3B:
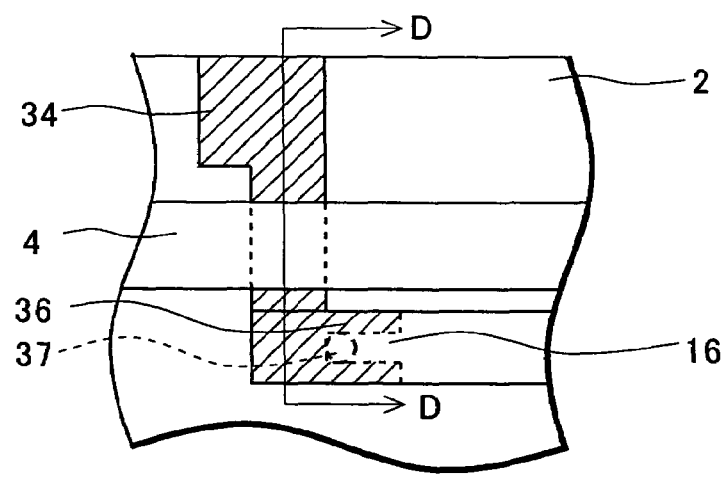
Figure 3C:
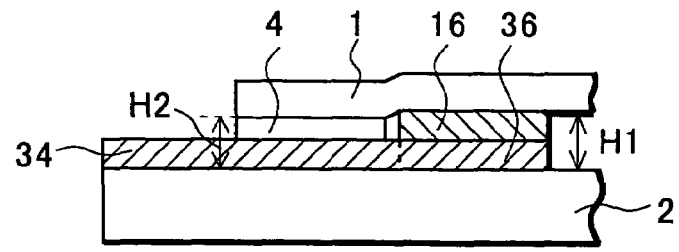
Figure 4A:
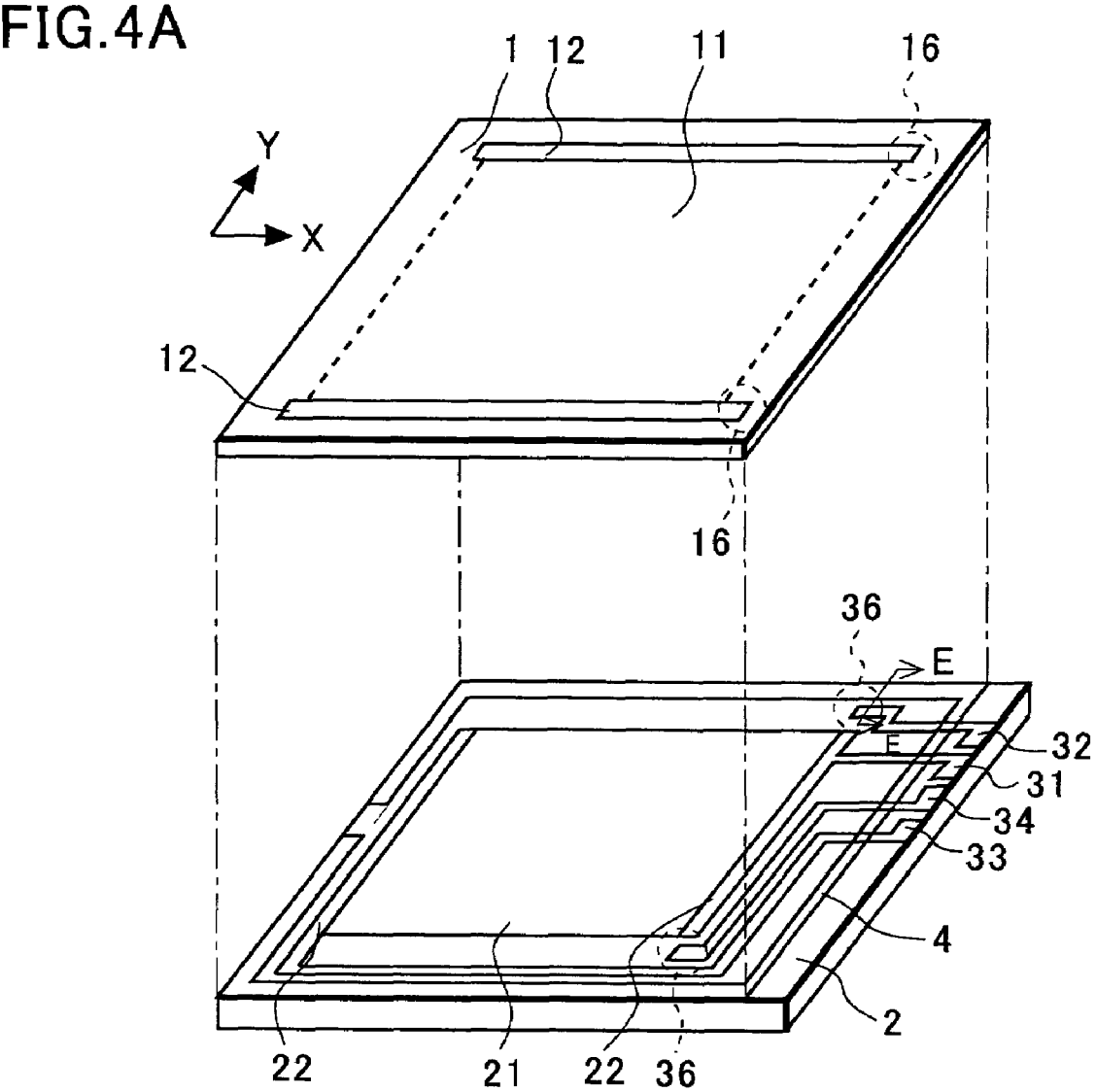
FIG. 4A is a perspective view and FIG. 4B is a cross-sectional view for describing a conventional touch panel.
Figure 4B:
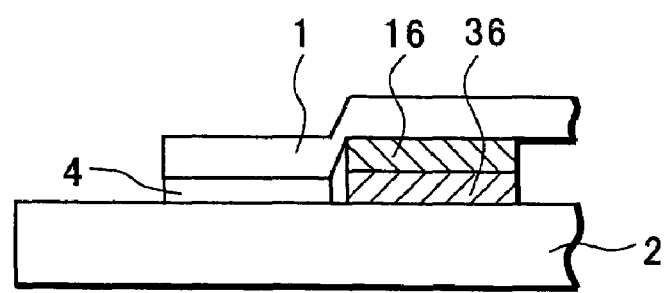
Figure 5A:
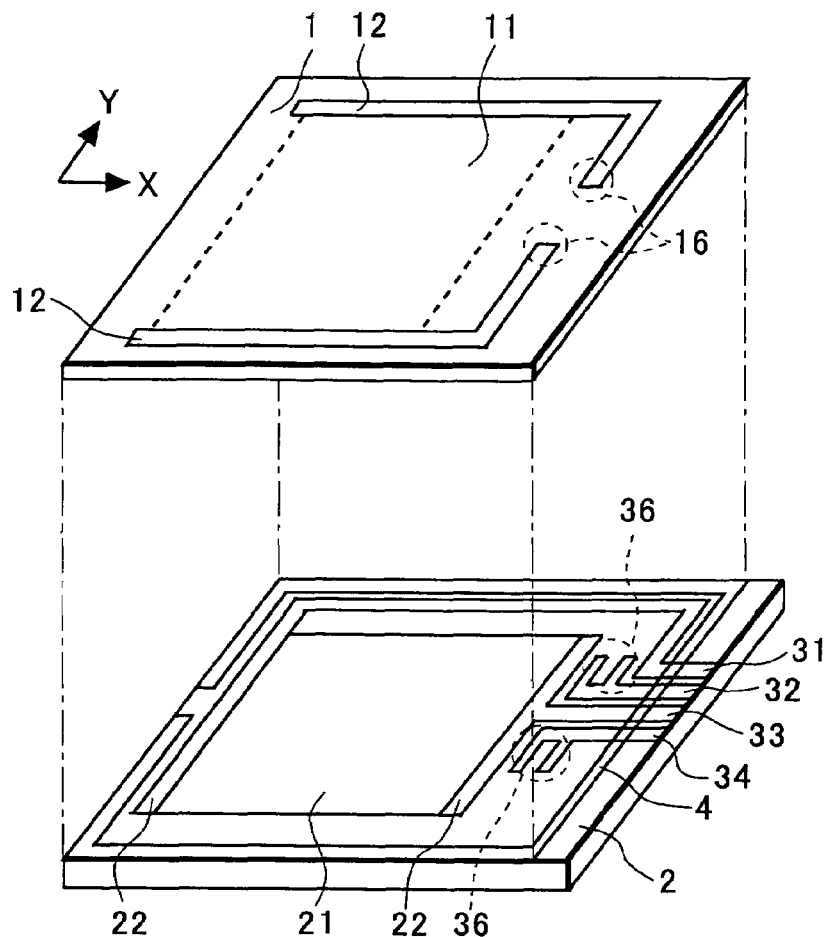
FIGS. 5A and 5B are perspective views and FIG. 5C is a cross-sectional view for describing the conventional touch panel.
Figure 5B:
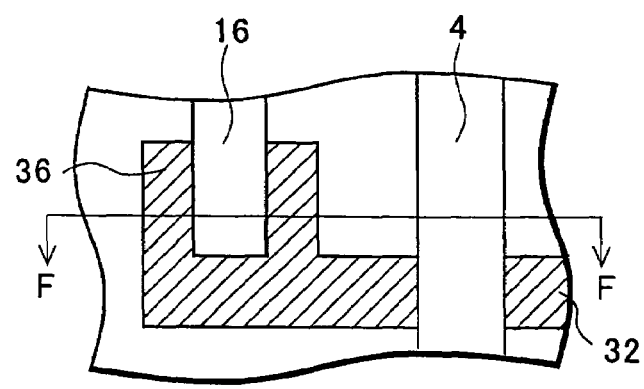
Figure 5C:
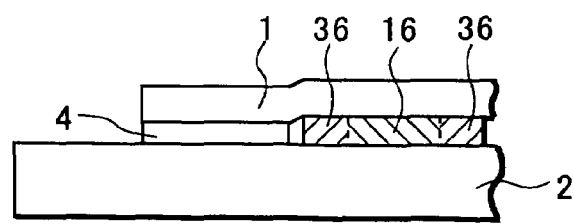

FIGS. 3A to 3C are constructional views of the touch panel according to the embodiment of the present invention. FIG. 3A is a plan view of the touch panel. As shown in the drawing, the touch panel of the embodiment is configured to dispose the upper substrate 1 shown in FIG. 1 and the lower substrate 2 shown in FIGS. 2A to 2C to face each other so that both of the upper position detection electrodes 12 and the lower position detection electrodes 22 collectively constitute a rectangle. Moreover, the touch panel is formed by attaching the upper and lower substrates 1 and 2 together by use of the sealing agent 4 provided on the peripheral edges of the lower substrate 2, and then by pressurizing and baking the upper and lower substrates 1 and 2.

The extending electrodes 31, 32, 33, and 34 are gathered and disposed substantially in the center of one edge of the lower substrate 2. In this way, it is possible to adjust the amount of formation of the sealing agent 4 in order to uniform the width of the sealing agent 4 formed in the vicinity of the lower electrode connecting portion 36 provided on another end of each of the extending electrodes 32 and 34, and to perform pressurization control easily. Moreover, the extending electrodes 31 and the like are connected to conductive portions of a flexible printed circuit (FPC) board by use of an anisotropic conductive film (ACF) and the like.

Although the extending electrodes 31 and the like are gathered and disposed substantially in the center of one edge of the lower substrate 2, the present invention is not limited only to this configuration. For example, it is also possible to arrange the extending electrodes 31 and the like on an end of one edge of the lower substrate 2 and the like.

FIG. 3B is an enlarged view of an area C shown in FIG. 3A. As shown in the drawing, the lower electrode connecting portion 36 is formed into the concave shape. The conductive adhesive 37 is applied to the concave portion, thereby connecting the upper electrode connecting portion 16 to the lower electrode connecting portion 36. Here, the formation width of the upper electrode connecting portion 16 and the formation width of the lower electrode connecting portion 36 are mutually equal. That is to say, it is not necessary to set the formation widths of the upper and lower electrode connecting portions 16 and 36 wider than the formation widths of the upper and lower position detection electrodes 12 and 22 of the upper and lower substrates 1 and 2. Accordingly, it is possible to widen the operating region of the touch panel.

Moreover, by forming the lower electrode connecting portion 36 into the concave shape, the conductive adhesive 37 spreads toward an opening when the upper electrode connecting portion 16 is connected to the lower electrode connecting portion 36 by use of the conductive adhesive 37. Accordingly, the upper and lower substrates 1 and 2 can be attached together without causing partial protrusion of the conductive adhesive 37. In this way, it is possible to reduce a strain on the upper substrate 1.

FIG. 3C is a cross-sectional view taken along the D-D line in FIG. 3B. As shown in the drawing, the upper electrode connecting portion 16 is connected to the lower electrode connecting portion 36 so as to overlap each other. For this reason, the connection between the upper and lower electrode connecting portions 16 and 36 is not unstable even when repeating the pressing operation of the touch panel. In this way, it is possible to identify the pressed position in a stably connected state.

As described above, the upper and lower electrode connecting portions 16 and 36 are formed by mixing the conductive paste and the filler having the grain size of about 15 μm. Accordingly, it is possible to maintain a stable height H1 which is equivalent to the overlap of the upper electrode connecting portion 16 and the lower electrode connecting portion 36. That is, it is possible to maintain a gap between the upper substrate 1 and the lower substrate 2 at the stable height. Theoretically, the height H1 is set in a range from about 15 μm to about 30 μm.

Moreover, the sealing agent 4 provided almost adjacently to the upper and lower electrode connecting portions 16 and 36 is formed above the extending electrode 34. As described previously, the filler having the grain size of about 8 μm is mixed in the sealing agent 4, while the filler having the grain size of about 15 μm is mixed in the extending electrode 34. For this reason, a height H2 equivalent to the overlap of the sealing agent 4 and the extending electrode 34 is theoretically set in a range from about 15 μm to about 23 μm.

When attaching the upper and lower substrates 1 and 2 together by pressurization and baking, an unillustrated buffer material is laid on the upper substrate 1 upon pressurization and baking. Accordingly, the upper substrate 1 is bent at the portion having the height H2, which is lower than the height H1, and it is therefore possible to attach the upper substrate 1 to the sealing agent 4. As described above, by setting the height H1 larger than the height H2, the upper substrate 1 is slightly curved upon filling gas into the gap between the upper and lower substrates 1 and 2. In this way, it is possible to reduce occurrence of Newton rings.

Moreover, the width of the sealing agent 4 is changed when attaching the upper and lower substrates 1 and 2 by pressurization, and the sealing agent 4 is formed almost adjacently to the upper electrode connecting portion 16. For this reason, the upper substrate is not largely strained between the sealing agent 4 and the upper electrode connecting portion 16.

According to the above-described touch panel of the embodiment, by providing the upper and lower electrode connecting portions 16 and 36 in the vicinities of the sealing agent 4 formed above the extending electrodes 32 and 34, the gap becomes less obvious between the height H1 equivalent to the overlap of the upper and lower electrode connecting portions 16 and 36, and, the height H2 equivalent to the overlap of the sealing agent 4 and the extending electrode 34. As a result, stress concentration in the positions on the upper substrate 1 corresponding to the upper and lower electrode connecting portions 16 and 36 is reduced when attaching the upper and lower substrates 1 and 2 together, and it is thereby possible to reduce occurrence of cracks at those portions.

What is claimed is:

1. A touch panel comprising:
   an upper substrate including a transparent conductive film and an upper position detection electrode on a surface thereof, the upper position detection electrode having an upper electrode connecting portion; and
   a lower substrate including a transparent conductive film, a lower position detection electrode, and an extending electrode on a surface thereof, the extending electrode having a lower electrode connecting portion,
   the upper substrate and the lower substrate being bonded together, with a sealing agent interposed therebetween, wherein:
   the transparent conductive film of the upper substrate and the transparent conductive film of the lower substrate face each other,
   the lower electrode connecting portion has a concave shape and has a conductive adhesive applied thereto such that the lower connecting portion overlaps and is electrically connected to the upper electrode connecting portion,
   the upper and lower electrode connecting portions are in a vicinity of a portion of the extending electrode where the sealing agent is disposed, and
   a combined height of the upper and lower electrode connecting portions is more than a combined height of the extending electrode and overlapping sealing agent.

2. The touch panel according to claim 1, wherein a formation width of the upper position detection electrode of the upper substrate is substantially equal to a formation width of the extending electrode of the lower substrate including the concave shape lower electrode connecting portion.

3. The touch panel according to claim 1, wherein the extending electrode is located substantially in the center of the lower substrate.

4. The touch panel according to claim 1, wherein a grain size of filler contained in a material of the extending electrode is greater than a grain size of filler contained in the sealing agent.

* * * * *